(No Model.) 4 Sheets—Sheet 3.

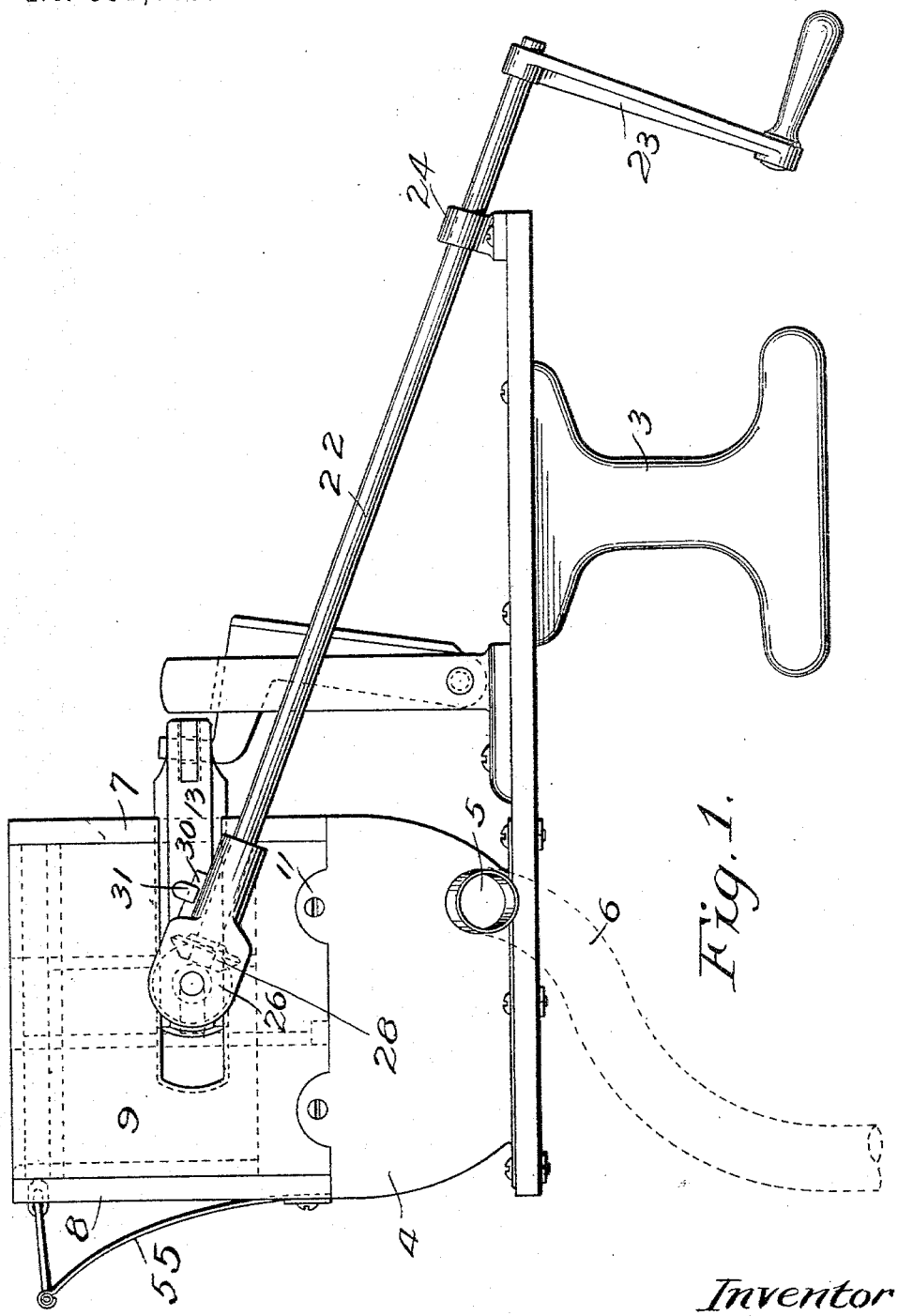

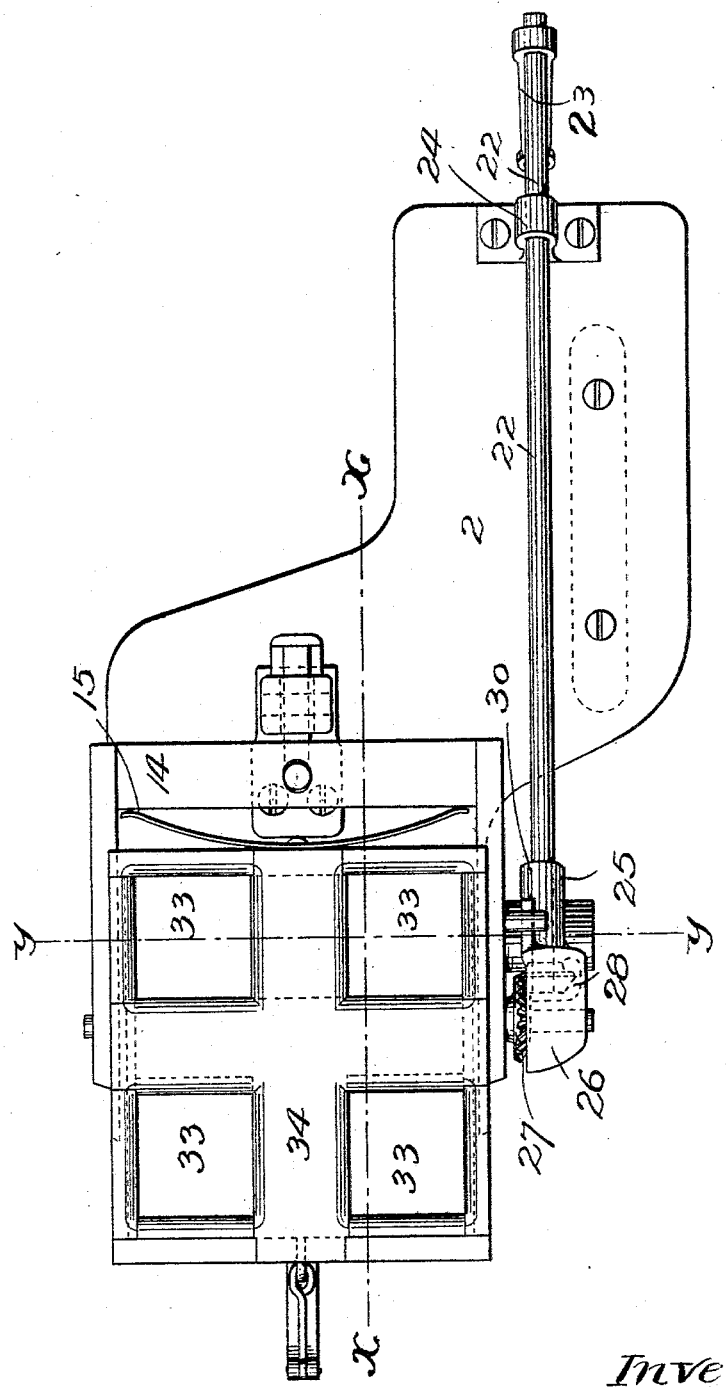

N. LOGAN.
MILKING MACHINE.

No. 531,687. Patented Jan. 1, 1895.

Witnesses.
C. H. Hill
F. S. Lyon

Inventor:
Nels Logan,
By Paul Hawley
his Attorneys.

(No Model.) 4 Sheets—Sheet 4.
N. LOGAN.
MILKING MACHINE.

No. 531,687. Patented Jan. 1, 1895.

Witnesses
C. H. Hill
F. S. Lyon

Inventor:
Nels Logan.
By his Attorneys

UNITED STATES PATENT OFFICE.

NELS LOGAN, OF MINNEAPOLIS, MINNESOTA.

MILKING-MACHINE.

SPECIFICATION forming part of Letters Patent No. 531,687, dated January 1, 1895.

Application filed March 16, 1894. Serial No. 503,828. (No model.)

*To all whom it may concern:*

Be it known that I, NELS LOGAN, of Minneapolis, in the county of Hennepin and State of Minnesota, United States of America, have invented certain new and useful Improvements in Milking-Machines, of which the following is a full, clear, and exact specification.

My invention relates to means for milking cows and in particular to a machine, the action of which will be almost identical to the action of the hand of a person milking, suction being entirely dispensed with.

The object which I have in view is to provide a milking machine, which will be small, which may be held in the lap of the person using it, which will be operated by simply turning a crank, and which will be strong and durable and yet light.

To this end my invention consists in general in a casing, the top of which is composed of a sliding plate having four openings for the teats of the udder, a thin sliding plate being provided in the top of the casing to grip the upper part of the teats and lower vertical plates adapted to close upon the teats and squeeze the milk therefrom.

Further and specifically my invention consists in simple means for operating said plates and for releasing them after an operation; and further in means for releasing the grip upon the teats at any time and instantly in case of restlessness of the animal.

The invention will be more readily understood by reference to the accompanying drawings, forming a part of this specification, and in which—

Figure 4:
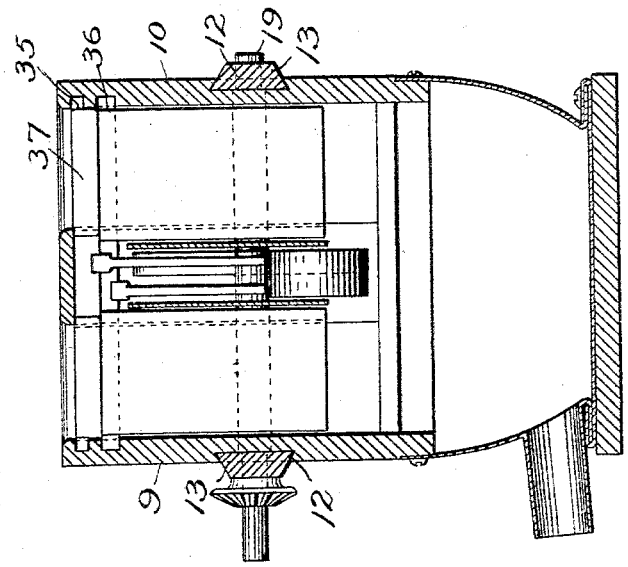
Figure 3:
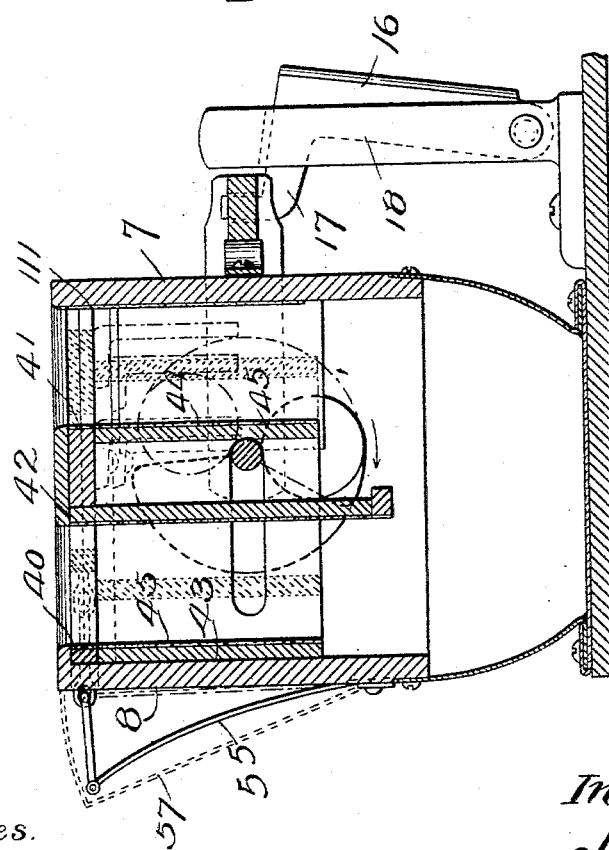
Figure 6:
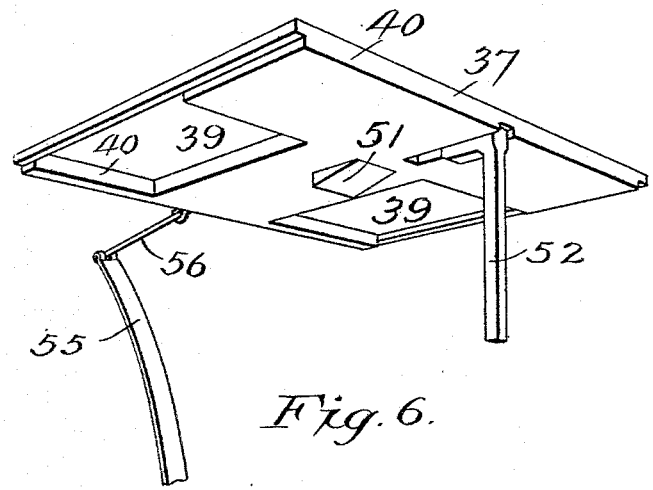
Figure 8:
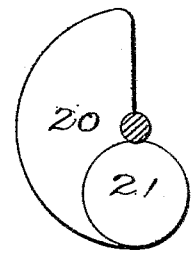
Figure 7:
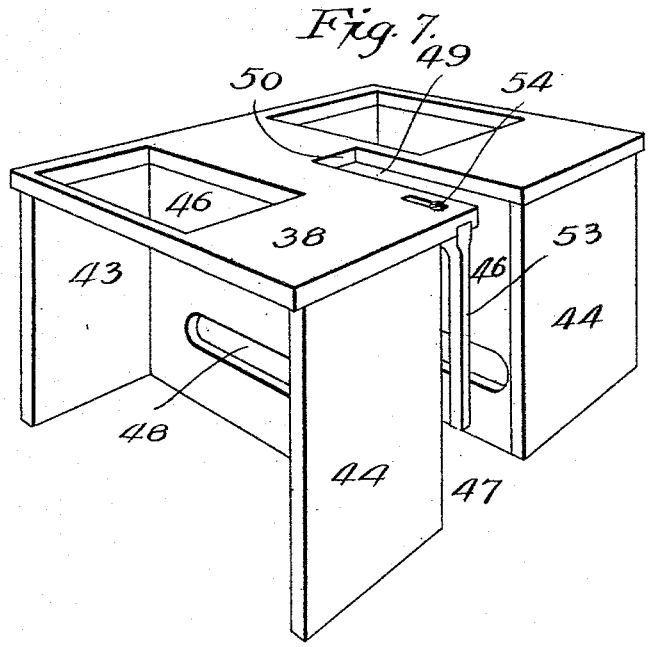
Figures 9, 10:
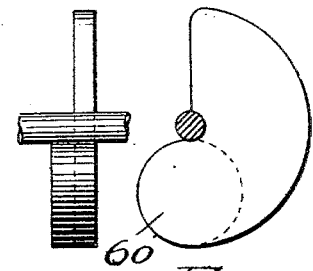
Figure 5:
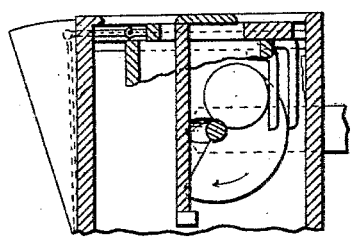

Figure 1 is a side view of a milking machine embodying my invention. Fig. 2 is a plan view thereof. Fig. 3 is a longitudinal section on the line $x$—$x$ of Fig. 2. Fig. 4 is a transverse section on the line $y$—$y$ of Fig. 2. Fig. 5 is a reduced sectional detail showing the parts in operation. Figs. 6 and 7 are respectively perspective views of the upper and lower movable parts of the device, the same being separated for clearness sake. Fig. 8 is a side view of the cams which I employ for operating the two movable parts. Fig. 9 is a reverse view thereof. Fig. 10 is an edge view of the cam.

As shown in the drawings, 2 represents the main plate and 3 the double yoke depending from the bottom thereof and adapted to be clasped between the knees of the operator when sitting on a stool. Upon the opposite end of the plate, which is of the peculiar form shown in order to carry the receiver more directly under the udder of the cow, I provide the receptacle 4, having the outlet nipple or pipe 5, from which a hose or pipe 6 (see dotted lines Fig. 1) leads to a pail. The receiver or receptacle 4 may be of any desired construction though I prefer to make it of tin, as shown best in Figs. 3 and 4.

The upper part of the device is preferably made of wood, consisting of the walls 7, 8, 9 and 10, which rest upon the top of the part 4 and are secured thereto by screws passing through the ears 11 thereon. In the sides 9 and 10 I provide the dove-tail grooves 12 in which the bars 13 are adapted to slide. These bars are connected across the front by the bar 14 normally pressed out by the spring 15 and adapted to be drawn in by the pivoted push part 16 engaging the cross-bar by the finger 17 and pivoted in the lower part of the grip standard 18. The inner ends of the bars 13 are provided with bearings for the shaft 19, which shaft is therefore movable in the box or casing. On the middle of this shaft I mount the cams 20 and 21 and for operating the shaft and cams I provide the longer and downwardly inclined shaft 22 provided with a crank 23 and held in a bearing 24 upon the inner end of the plate or board 2. The upper end of the shaft is held in the sleeve 25 on the head 26, which head is held or journaled on the extended end of the shaft 19 and serves as a hood for the two beveled gears 27 and 28 keyed respectively to the shafts 19 and 22. The hood 26 is prevented from pulling off by the engagement of a lug 30 thereon with a finger 31 projecting from the bar 13. The connection between the beveled gear 28 and the end of the shaft 22 may be a slidable one, a long feather being used, or, in place thereof the gear may be firmly secured thereon and the shaft made movable through the bearing 24 to allow the forcing back of the shaft 19. In the top of the casing are four holes 33 and the part 34 which separates them is preferably made removable. On the inside of the opposite walls 9 and 10 are guide grooves 35 and 36, one above the other and adapted to hold the slidable plates 37 and 38.

As shown in Fig. 6 the plate 37 is provided with the holes 39 in its rear end and its forward edge when the plate is in the Fig. 8 position just reaches the forward edge of the front pair of openings in the top. The edges 40 are guarded by thin rubber strips 41, as are also the surfaces of the inside of the wall 37 and the intermediate wall 42, which wall is in two sections, situated between the vertical depending pressure plates 43 and 44 of the plate 38. The forward surfaces of the pressure plates 43 and 44 are faced with rubber or soft substance 45. (See Fig. 3.) Longitudinal partitions 46 join the middle ends of the plates 43 and 44 and a considerable space 47 is left between these partitions for the free operation of the cams 20 and 21. The plate 37 and the parts attached thereto move with respect to the shaft and therefore long slots 48 are made in the partitions 46. In the top or body of the plate 38 is a slot 49 with the shoulder 50, of which the lug 51 on the bottom of the plate 37 is adapted to engage when the plate 37 is drawn back.

The cam 20 engages with a pin or arm 52 depending from the plate 37, while the cam 21 is adapted to engage with a similar arm 53 depending from the plate 38. Both of these arms are made longitudinally adjustable in their plates by the means shown in Figs. 6 and 7, namely the guide-slot and the tightening screws 54. In this manner the thrust of the plate may be adjusted as required. For drawing back the plate 37 and therewith the lower parts I may provide any convenient means, as for instance the strong flat spring 55 connected by a strap 56 to the rear edge of the plate 37. A small housing is preferably arranged over this spring. (See dotted lines 57, Fig. 3.)

The operation of my machine is as follows: The machine is placed beneath the udder and the teats inserted in the openings 33 which with the partitions, the intermediate and outside walls and the pressure plates form square ducts at this time. The crank is then turned and the cam 21 strikes the arm 52 and carries forward the plate 37 the edges thereof squeezing the teats at the top close to the wall 7 and 42. At the instant that the plate 37 arrives in position the small circular cam 32 arrives in its upper position and engages the arm 53 and gradually moves forward the plate 38 with its pressure plates 43 and 44, gradually squeezing the milk from the full teats. Meantime the periphery of the cam 21 holds the plate 37 in position to prevent the milk from passing back into the udder. As the small cam passes from beneath the end of the finger 53 the lobes of the cam 20 also free the finger 52 and the plate 37 is drawn back by the heavy spring 55. The lug 51 catches the plate 38 and draws it back also. At each revolution of the crank this operation is repeated.

The device may be instantly freed from the teats at any time during the stroke of the cam by simply squeezing the standard 18 and the push 16 in the unoccupied hand of the user.

Having thus described my invention, I claim as new and desire to secure by Letters Patent—

1. The combination, in a milking machine, of a suitable casing, with a squeezing or gripping plate to operate upon the upper part of the teats and slidably arranged in said casing, and lower and upright pressure plates to squeeze the milk from the lower part of the teats, and also arranged to slide in said casing, and means for operating said plates, substantially as described.

2. The combination, in a milking machine, of a suitable casing with a squeezing or gripping plate to operate upon the upper part of the teats and arranged to slide in horizontal grooves in said casing, and lower and upright pressure plates to squeeze the milk from the lower part of the teats and also arranged to slide in similar grooves in said casing, means for regulating the thrust of said plates, and means for operating said plates, substantially as described.

3. The combination, in a milking machine, of a suitable casing with a squeezing or gripping plate to operate upon the upper part of the teats, and arranged to slide in horizontal grooves in said casing, and lower and upright pressure plates to squeeze the milk from the lower part of the teats and also arranged to slide in similar grooves in said casing, adjustable arms arranged upon both upper and lower plates for regulating the thrust thereof, and means engaging said arms for operating said plates, substantially as described.

4. The combination, in a milking machine, of a suitable casing with a squeezing or gripping plate to operate upon the lower part of the teats and arranged to slide in horizontal grooves in said casing, and lower and upright pressure plates to squeeze the milk from the lower part of the teats and also arranged to slide in similar grooves in said casing, adjustable arms arranged upon both upper and lower plates for regulating the thrust thereof, a shaft mounted in horizontally movable bearings in said casing, cams arranged on said shaft for operating said adjustable arms and plates, and means for rotating said shaft and cams, substantially as described.

5. The combination, with the casing provided with holes in its top for the teats, the gripping plate, the pressure plates arranged beneath the same and independently movable, a shaft, cams thereon for operating the same, and means for moving back the said first mentioned shaft and therewith said cams and said plates, substantially as described.

6. The combination, with the bed plate 2, of the double yoke depending therefrom and adapted to be grasped between the knees of the user, the casing erected on said plate, the lower part of said casing forming a milk receptacle, the gripping plates movable in the upper part of said casing, the pressure plates arranged beneath the said gripping plates, the intermediate partitions or walls, the arms upon said gripping and pressure plates, the cams to engage said arms and means for operating said cams, and means for drawing back said plates after an operation of said cams, substantially as described.

7. The combination, with the bed plate 2, of the double yoke depending therefrom and adapted to be grasped between the knees of the user, the casing erected on said plate, the lower part of said casing forming a milk receptacle, the gripping plates movable in the upper part of said casing, the pressure plates arranged beneath the said gripping plates, the intermediate partitions or walls, the arms upon said gripping and pressure plates, the cams to engage said arms and means for operating said cams, means for drawing back said plates after an operation of said cams, and said gripping and pressure plates and the pressure surfaces of said partition being faced with a soft substance, substantially as described.

In testimony whereof I have hereunto set my hand this 3d day of March, A. D. 1894.

NELS LOGAN.

In presence of—
C. G. HAWLEY,
GEORGE GREGORY.